Figure 1:
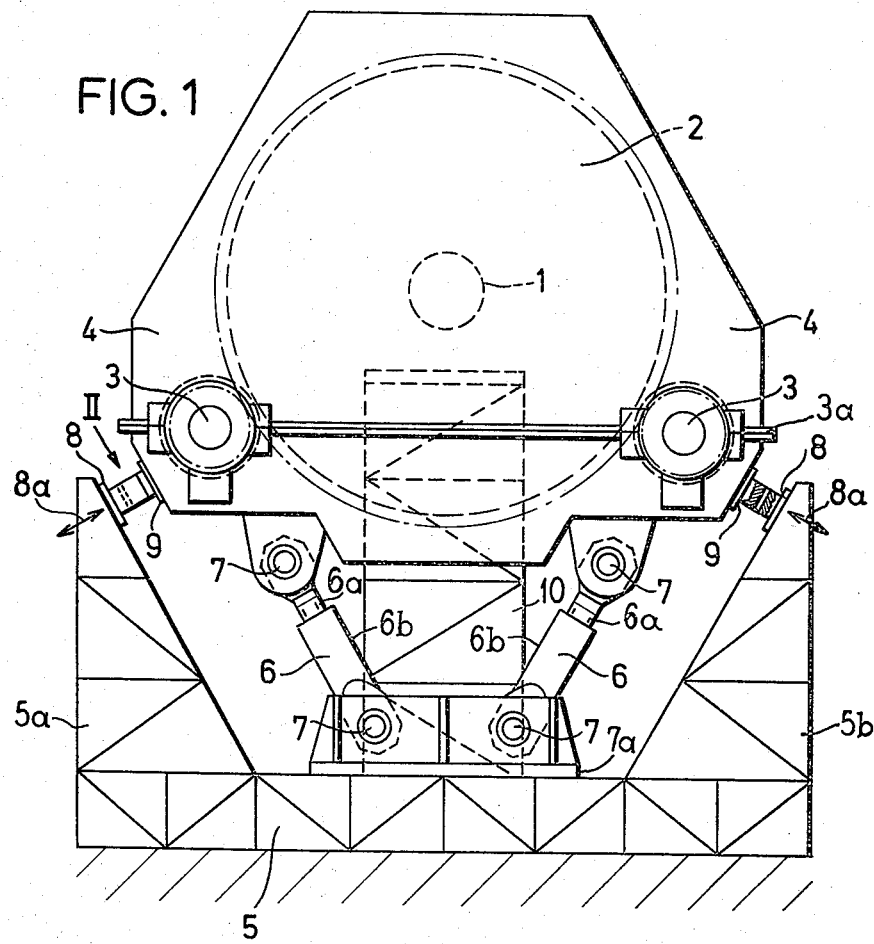

United States Patent [19]
Schroder

[11] 3,890,852
[45] June 24, 1975

[54] DRIVE FOR CONVERTERS, ROTATING DRUMS, PLATE CONVEYORS OR THE LIKE

[76] Inventor: Walter Schroder, 463 Bochum-Stiepel, Stemmannsfeld, Germany

[22] Filed: July 6, 1973

[21] Appl. No.: 377,016

[52] U.S. Cl. .................................. 74/410; 74/410
[51] Int. Cl. ........................................... F16h 57/00
[58] Field of Search ............................ 74/410, 409

[56] References Cited
UNITED STATES PATENTS

| | | | |
|---|---|---|---|
| 3,149,499 | 9/1964 | Schmitter | 74/409 |
| 3,167,975 | 2/1965 | Durand | 74/410 |
| 3,706,237 | 12/1972 | Dere | 74/410 |
| 3,760,654 | 9/1973 | Fisher | 74/410 |

*Primary Examiner*—Wesley S. Ratliff, Jr.

[57] ABSTRACT

A drive mechanism for transmitting rotary motion to a large rotary drive member including a larger driven gear mounted for rotation about an axis, first and second spaced pinion gears in driving mesh with said larger gear, a carrier plate for said pinion gears, stop means limiting the movement of the plate in one lateral direction and counter stop means limiting the rotation of the plate in another lateral direction with the stop means having cushioning members and also constructed to limit axial movement of the plate, and return elements acting on the plate to stabilize a neutral or intermediate position and additionally damp vibration of the plate.

2 Claims, 2 Drawing Figures

PATENTED JUN 24 1975  3,890,852

DRIVE FOR CONVERTERS, ROTATING DRUMS, PLATE CONVEYORS OR THE LIKE

BACKGROUND OF THE INVENTION

The present invention relates to improvements in mechanisms for driving converters, rotating drums, plate conveyors or the like which require considerable driving power and which have demands for variations in the amount of power used. More particularly, the invention relates to a drive mechanism wherein a larger drive gear is connected to a driven machine which can encounter shock load or sustantial variations in load and wherein the gear is driven by a pair of pinions circumferentially spaced on its periphery and which are controllably shiftable in a manner to obtain uniform load on the pinions and to reduce the wear and obtain regulation for uniform backlash between the teeth of the pinions and the larger gear.

Various efforts have been made in a drive mechanism for obtaining uniform load where multiple pinions are used to drive a larger gear. One suggestion for maintaining uniform tooth play or backlash between the pinions and larger gear has been to apply spacing rings on the pinions which engage a recess on the driven gear. This has not been wholly satisfactory because with the event of nonuniform distribution of output, the spacing ring for one pinion will be strongly stressed while the other spacing ring will have an absence of contact.

Another problem which has been encountered is with the deficiency of lubrication with one or both of the pinions which leads to wear and changes the spacing and load on the different gears.

It is accordingly an object of the present invention to provide an improved drive of the type described wherein nonuniform driving forces or load absorption from the pinions can be accommodated without damage to the parts.

A further object of the invention is to provide an improved drive wherein the pinions are held at a controllable tooth depth location relative to the main gear and can shift rotationally so that chatter and backlash and changes in load due to shock load or increase or decrease in load can be absorbed and accommodated.

A still further object of the invention is to provide a support relationship for multiple pinions driving a larger gear wherein both axial and lateral relative movement is accommodated to absorb deviations due to drive variations.

A feature of the invention is in the provision of a support plate which carries the pinions and stationary stock members which limit the movement of a carrier for the pinions thereby limiting or controlling the change in backlash between the pinions and the driven gear. The stop members function to limit the movement of the carrier relative to the large gear.

A further feature of the invention is the provision of a carrier for the pinion driving a large gear wherein the stop members limit the movement of the carrier in a lateral or radial direction as well as in an axial direction. The directional limitation in the direction of the axis is of particular advantage with straight gear tooth construction for the pinions and the driven gear. Also, incorporated between the carrier and a rigid support such as the machine base are return elements which function to hold the carrier yieldably in a central or neutral position and apply damping or yieldable force to maintain the neutral position and also to damp the vibration of the carrier and stabilize the position of the carrier between the stop members.

Other objects, advantages and features will become more apparent as will equivalent structures which are intended to be covered hereby, in the teaching of the principles of the invention in connection with the disclosure of the preferred embodiments in the specification, claims and drawings in which:

DRAWINGS

Figure 2:
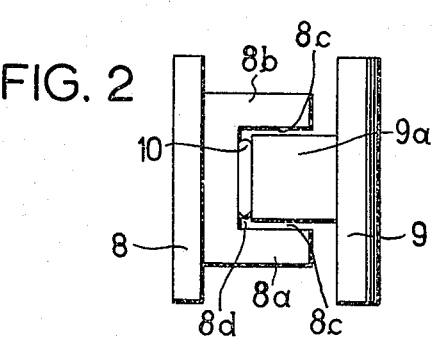

FIG. 1 is a somewhat schematic elevational view of a drive constructed and operating in accordance with the principles of the present invention; and FIG. 2 is an enlarged detailed fragmentary view of a stock mechanism with the view taken generally as indicated by the arrow II in FIG. 1.

DESCRIPTION

The drive mechanism is used for converters, rotating drums, conveyors, crushers, grinders and other heavy equipment which requires the transmission of a substantial rotational force from a drive engine or motor to the machine. The driven machine has a shaft 1 to which is drivingly connected a large gear 2. The large gear is driven by two circumferentially spaced pinions 3 which have teeth in driving mesh with the gear 2.

The pinions are mounted on a carrier plate 4 which is supported at a right angle to the shaft 1 but to permit movement in its plane. The plate can shift radially relative to the shaft so that with movement of the plate, the mesh between the teeth of the pinions and the main gear changes.

The plate is held pivotally relational in a neutral position by telescoping guide rods 6 which are pivotally connected at their upper ends 7 to lugs on the plate and pivotally connected at their lower end at 7 to a stationary machine base 5. The connections 7 may be pivotal joints pivotal about an axis extending parallel to the axis of the shaft 1 or ball and socket joints may be employed at either or both of the upper and lower connections 7. The members 6 extend to have their axes extend at right angles to a line extending radially from the shaft 1 through the pinion center 3 and preferably the axis of the member 6 extends through the center of the pinions 3.

The telescoping members 6 include a piston 6a telescopingly received in a guide cylinder 6b, and each unit may be either a spring loaded piston arrangement or a hydraulic shock absorber type of piston which applies a neutralizing restoring force to the plate maintaining the neutral rotational position.

The drive pinions 3 are driven by means of individual motors or through a preconnected unitary drive on a common motor. The shafts of the pinions are constructed so that they may be connected to the drive motor through a universal drive or a similar mechanism which permits relative movement of the pinions with pivotal movement of the carrier plate 4. For example, pinion shafts may be driven through bevel gears interconnected by the cross-shaft 3a as illustrated with the cross-shaft connected to a drive, not shown, driven by a common drive motor.

For the maintenance of the necessary tooth relationship or backlash between the teeth of the pinions 3 and the teeth of the driven gear 2, the stop members limit the radial movement of the carrier plate. The stop members are mounted on vertical brackets 5a and 5b on the machine base 5 as shown.

For adjustment of the desired tooth play or tooth spacing, the stop members 8 and the counter stop members 9 are adjustable as indicated by the arrowed lines 8a. This may be accomplished by lateral adjustment of the brackets 5a or 5b, or it may be accomplished by placing shims beneath the stop members 8. Also, threaded adjustment means could also be provided as will be appreciated by those versed in the art from the foregoing description.

Between the stop members 8 and 9, cushioning return elements 10 are located. These may be spring elements or hydraulic pads or pneumatic units. They function to damp the vibration of the carrier plate 4 and stabilize it in its middle position as determined by the adjusted positions of the stop members 8 and 9.

Thus, as wear occurs due to unequal loads, unequal lubrication or environmental circumstances, and an equalization of load is desired between the pinions, the stops 8 and 9 can be adjusted for positioning the pinions in their optimum space. The pinions, however, will automatically seek and attain their optimum positions during operation as controlled by the load due to the resiliency of the members 6 and the resiliency of the pads. 10. The pads are positioned so that their forces are applied substantially in a direction parallel to a radial line drawn through the axis of the shaft 1 and the axis of the gears 3. The telescoping members 6 may be individually adjustable as to the forces which they apply and their restoring speeds, or the base 7a mounted on the base plate 5 may be horizontally adjustable.

The plate 4 is suitably vertically supported so that the axes of the pinions 3 are maintained parallel to the axis of the shaft 1 such as by a plate support 10. However, support of the plate in an axial direction relative to the position of the gears 3 is maintained by the stop and counter stop 8 and 9.

The stop members as shown in FIG. 2 include a projection 9a on the counter stop member 9 and bracketing fingers 8a and 8b on the stop member 8. The projection 9a is of less width than the space between the fingers 8a and 8b leaving spaces 8c which determine the total amount of axial movement of the plate carrier 4.

Also, the space 8d which is occupied by the cushion 10 determines the total amount that the projection 9a can project into the gap between the fingers. When the cushion 10 is completely compressed, this determines the total depth that the teeth of the pinion can be inserted into the teeth of the gear 2. Means may be provided in conjunction with the vertical bracket 10 to prevent the plate 4 from lifting upwardly to permit disengagement of the teeth between the pinion and gear, but this normally is controlled by the shock absorber 6.

Thus, the stop members 8 and 9 are laterally open in a circumferential direction so as to permit limited movement of the plate in a rotational direction as controlled by the shock absorber 6. The stop members 8 and 9, however, control the lateral movement of the plate in a direction of radial lines extending through the pinion and gear shaft, and permit limited movement in an axial direction.

I claim as my invention:

1. A drive mechanism for transmitting rotary motion to a large rotary driven member comprising in combination:

a larger driven gear mounted for rotation about an axis;

first and second spaced pinion gears in driving mesh with said larger gear;

a movable rigid carrier plate for said pinion gears having movement in a plane transverse of the axis of said larger gear with said gears rotatably mounted thereon at fixed locations so that said pinions move with said plate;

stop means limiting the movement of said carrier plate having stop members facing in a direction generally radially toward the axis of the larger gear to control the depth of the mesh between the pinions and larger gear;

and cushioning means yieldingly cushioning the movement of said carrier plate.

2. A drive mechanism for transmitting rotary motion to a large rotary driven member comprising in combination:

a larger driven gear mounted for rotation about an axis;

first and second spaced pinion gears in driving mesh with said larger gear;

a movable rigid carrier plate for said pinion gears having movement in a plane transverse of the axis of said larger gear with said gears rotatably mounted thereon at fixed locations so that said pinions move with said plate;

and stop means limiting the movement of said carrier plate including a first stop member with a projection and a second stop member having a recess receiving said projection so that the projection limits the movement of the stop member in a direction parallel to the axis of the larger gear.

* * * * *